United States Patent [19]

De Luca et al.

[11] 4,334,129
[45] Jun. 8, 1982

[54] TELEPHONE DIGITAL OFFICE CUTOVER SYSTEM

[75] Inventors: Paul V. De Luca, Plandome Manor; John J. Gazzo, Commack; Thomas A. Hollfelder, Huntington, all of N.Y.

[73] Assignee: Porta Systems Corp., Syosset, N.Y.

[21] Appl. No.: 197,911

[22] Filed: Oct. 17, 1980

[51] Int. Cl.³ ............................................... H04M 3/30
[52] U.S. Cl. ............................................... 179/175.11
[58] Field of Search .................. 179/175.2 R, 175.2 D, 179/175.11, 175.3 R, 175.3 A, 90 CS, 175

[56] References Cited

U.S. PATENT DOCUMENTS 3,829,627 8/1974 Short et al. .................. 179/175.2 D Primary Examiner—Thomas A. Robinson
Attorney, Agent, or Firm—Charles E. Temko

[57] ABSTRACT

A system for automated pre-testing of subscriber pairs prior to final transfer from an old telephone office to a new digital central office. The system combines a known line verification tester, a trunk transition system, and an optional line ringing tester interconnected through a novel micro computer based interface. The interface controls the tests performed by the line verification tester and line ringing tester prior to transfer of tested circuits to the central office.

2 Claims, 1 Drawing Figure

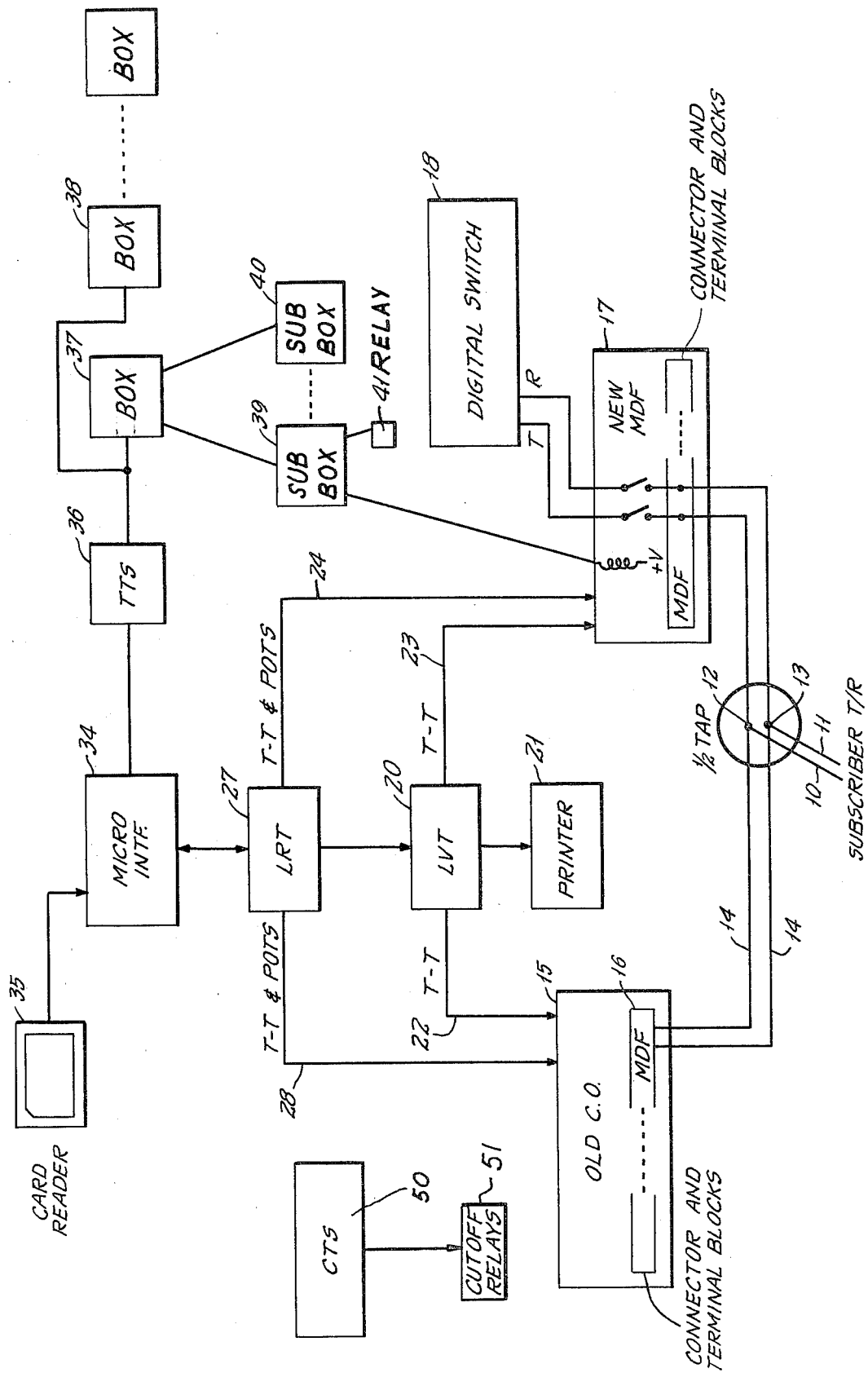

TELEPHONE DIGITAL OFFICE CUTOVER SYSTEM

BRIEF DESCRIPTION OF THE DRAWINGS

In the drawings, to which reference will be made in the specification, similar reference characters have been employed to designate corresponding parts throughout the several views.

The single FIGURE is a schematic wiring diagram of an embodiment of the invention.

DETAILED DESCRIPTION OF THE DISCLOSED INVENTION

Before entering into a detailed consideration of the structural aspects of the embodiment, a brief description of the sequence of operation is considered apposite.

As has been mentioned, the system includes a line verification tester and a trunk transition system used for conducting "board-to-board" testing of the new digital office. The line verification tester reads a pre-prepared punch card containing the subscriber's old and new directory number, equipment assignment and location, and stores this information in memory. It next connects to the subscriber's line via a test trunk to the old central office, following which it connects to the subscriber's line via a test trunk to the new central office. Following this, the line verification tester signals to the trunk transition system to operate a temporary relay connecting the subscriber via a half tap to the new central office line equipment. At this point, it performs tests including noting the presence of foreign AC or DC voltages. It looks for open circuit around the loop, for a reversal, and for excess resistance around the loop. These tests being completed, the line verification tester signals the trunk transition system to release the temporary relay, following which it releases test trunk connections into both old and new offices.

For those subscribers having individual pair assignment, the above tests are sufficient. However, in the case of party lines which are signalled by frequency selective ringing, further tests need to be conducted using a line ringing tester. The line ringing tester reads the pre-prepared punched card and stores the available information in memory, as above. It next connects to the subscriber line via a test trunk to the old office, and following this it accesses a pots line (e.g. plain old telephone system) to the new central office and dials all but the last digit of the subscriber number. As the next step it attaches a frequency recorder test module across the line at the test trunk of the old office. This module appears as an AC low impedance to the line. The line ringing tester then signals the trunk transition system to operate a temporary relay connecting the subscriber via a half tap to the new central office line equipment. It then completes connection to the subscriber line via the pots line to the new central office by dialing the last digit of the subscriber number.

With the completion of the ring circuit, the line ringing tester measures and stores the frequency of the ringing signal. It then goes off hook on the old central office test trunk to the subscriber's line and trips the ringing circuit. The tester removes the test module from the old central office test trunk and signals the trunk transition system to release the temporary relay. It then releases the old central office test trunk connection and the new central office pots connection.

The above steps are then repeated, but using a test trunk to the new central office and the pots line to the old central office. The ringing frequency obtained during the second series of steps is compared with the previously obtained frequency, and any mismatch is noted. In addition, these measured ringing frequencies could be compared to information obtained from the pre-punched card to verify either or both office subscriber ringing frequencies.

The above tests being satisfactorily completed, the office cutover is now ready for operation. At this point, the cutover transition disables the old office by energizing cutoff relays installed in the old office, and the trunk transition system enables the new digital office by operating temporary relays connecting the subscriber line into the new office.

With reference to FIG. 1 in the drawing, in accordance with the invention, the system connects with the tip 10 and ring 11 components of an individual subscriber pair through first and second half taps 12 and 13, respectively, on lines 14 interconnecting with an old office 15 having a plurality of main distributing frames 16 as well as a new office 17 serviced by digital switching 18.

A line verification tester 20 including a printer 21 is interconnected through test trunks 22 and 23 to the old office 15 and new office 17. The details of the line verification tester, including the printer are similar to those disclosed in U.S. Pat. No. 3,752,940 granted Aug. 14, 1973 to Vincent F. Santulli, and assigned to the same assignee as the present application.

Interconnected to the line verification tester 20 is a line ringing tester 27 interconnected by both test trunks and pots lines at 28 and 24 to the old and new offices 16 and 17. The line ringing tester is similar to one marketed by Porta Systems Corp., of Syosset, N.Y., model LRT-725. It is used for the purpose of measuring the frequency of the ringing potential which the old and new central offices apply to the subscriber telephone set. Within certain loop impedance requirements, the test is accomplished without the ringing or bell tapping of the subscriber set. The sequence of operation of this component will be more fully set forth hereinbelow. The line ringing tester 27 is interconnected through a micro computer interface 34 to a card reader 35, for example model 300, manufactured by Documation Corp.

Also interconnected into this system through the micro computer interface 34 is a trunk transition system, including a manual cutover console indicated by reference character 36. The details of this element are disclosed in U.S. Pat. No. 3,920,927, dated Nov. 18, 1975, said patent being, again, assigned to the same assignee as the instant application. The trunk transition system 36 interconnects with boxes 37 and 38, sub-boxes 39 and 40 and appropriate relays 41, which provide automatic cutover to the new office upon the completion of testing procedures.

SEQUENCE OF OPERATION

During the installation of the new telephone office, each subscriber line is provided with a pre-prepared IBM punch card containing the subscriber's old and new directory number, equipment assignment and location which are arranged for serial reading by the card reader 35. With the commencement of an operational cycle for each subscriber line, the card reader 35 reads this information into memory available at the micro computer interface 34.

As a next step, the line verification tester connects to the subscriber line via a test trunk 22 to the old central office 15. It next connects the subscriber line via a test trunk 23 to the new central office, following which it signals the trunk transition system 36 to operate a temporary relay e.g. 40 to connect the subscriber line via a half tap to the new central office line equipment.

At this point of the cycle, the line verification tester 20 performs a plurality of tests, including the noting of the presence of foreign alternating current or direct current voltages, and examination for open circuitry around the loop, reversals, or excess resistance around the loop. The tests completed, the line verification tester signals the trunk transition system to release the relay 40. It subsequently releases the test trunk connections into both the new and old offices.

The next step involves the testing of frequency selective ringing party lines using the trunk transition system 36 and the line ringing tester 27. The subscriber information on the punch card has already been read into memory, and the line ringing tester connects to those subscriber lines having frequency selective ringing in serial fashion. It accesses a pots line 24 to the new central office 17 and dials all but the last digit of the subscriber number. As the next step, the line ringing tester connects to the subscriber line via a test trunk 28 to the old central office 15. It next attaches a frequency recorder test module which is part of the line ringing tester across the line at the test trunk 28 leading to the old office. This test module appears as an alternating current low impedance to the line. The line ringing tester next signals the trunk transition system to operate a temporary relay e.g. relay 41 connecting the subscriber via a half tap to the new central office line equipment. It then completes connection to the subscriber line via pots line 24 to the new central office by dialing the last digit of the subscriber number.

With the commencement of ringing, the line ringing tester stores the frequency of the ringing signal, and subsequently goes off hook on the old central office test trunk 28 to the subscriber line and trips ringing.

Next, the line ringing tester disconnects the test module from the old central office test trunk and signals the trunk transition system to release the temporary relay 41. It then releases the old central office test trunk connection and the new central office pots connection.

Finally, the line ringing tester repeats all of the above steps, but uses a test trunk to the new central office and a pots line to the old central office. It then compares the ringing frequency measurements obtained in each case and notes any mismatch, which may be indicated in a print out from the printer 21.

Following this test, the line verification tester and line ringing tester cycle through all of the subscriber numbers assigned to the new central office, notation being made of all faults discovered for subsequent correction prior to cutover.

The actual cutover is accomplished automatically at the conclusion of the above described testing cycle. A cut through system 50 of a type described in U.S. Pat. No. 3,772,621, for example, energizes cut off relays 51 in the old office 15, following which the trunk transition system 36 enables the new office by operating the temporary relays connecting the subscriber line into the new office. The final cutover is a semi-automatic function, and involves a person at the console of the cutover transition system. Except for this last mentioned function, the entire sequence of operations described above is performed completely automatically, and requires no supervision during the serial testing of all of the subscriber lines in the new telephone office.

We wish it to be understood that we do not consider the invention limited to the precise details of structure shown and set forth in this specification, for obvious modifications will occur to those skilled in the art to which the invention pertains.

We claim:

1. A system for automated testing of telephone subscriber pairs prior to cutover from an old telephone office frame to a new digital control office frame comprising: a plurality of serially readable cards each having coded information relative to a subscriber pair, including old and new directory numbers; card reading means for serially reading said cards; a computer means interfacing with said card reader; a line verification tester interfacing with said computer means and having test trunks interconnecting the subscriber pairs in said old and new offices; signal means sensing the output of said line verification tester; half tap means interconnecting each of said subscriber pairs to said old and new offices; said old office having cut off relays corresponding to each subscriber pair, and a manually controlled cut through system controlling said cut off relays; said new office having a digital switching system, and relays for interconnecting said switching system to individual subscriber pairs; and a trunk transition system interfaced with said computer means, and controlling said relays at said new office.

2. The system set forth in claim 1, further comprising a line ringing tester interfacing said computer means and signal means, and having test trunk and pots line interconnections to said old and new offices.

* * * * *